US009852185B2

(12) United States Patent
Su et al.

(10) Patent No.: US 9,852,185 B2
(45) Date of Patent: Dec. 26, 2017

(54) APPROXIMATE DISTINCT COUNTING IN A BOUNDED MEMORY

(71) Applicant: Oracle International Corporation, Redwood Shores, CA (US)

(72) Inventors: Hong Su, San Carlos, CA (US); Mohamed Zait, San Jose, CA (US); Sunil Chakkappen, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 246 days.

(21) Appl. No.: 14/818,663

(22) Filed: Aug. 5, 2015

(65) Prior Publication Data

US 2017/0024387 A1    Jan. 26, 2017

Related U.S. Application Data

(60) Provisional application No. 62/195,740, filed on Jul. 22, 2015.

(51) Int. Cl.
G06F 17/30    (2006.01)

(52) U.S. Cl.
CPC .............. G06F 17/30489 (2013.01)

(58) Field of Classification Search
USPC ........ 707/713, 607, 687, 705, 790, 718, 821
See application file for complete search history.

(56) References Cited

U.S. PATENT DOCUMENTS 8,290,931 B2 * 10/2012 Hong ................ G06F 17/30312
707/713
2009/0281985 A1 * 11/2009 Aggarwal ......... G06F 17/30489

OTHER PUBLICATIONS

Flajole et al., "HyperLogLog: the analysis of a near-optimal cardinality estimation algorithm", 2007 Discrete Mathematics and Theoretical Computer Science (DMTCS), Nancy, France, 20 pages.
Finnerty, Jim, "Avoiding the OLAP Cliff for Count Distinct Queries in Vertica", Big Data, Vertica 7, dated Mar. 5, 2014, 6 pages.
Durand et al., "Loglog Counting of Large Cardinalities (Extended Abstract)", G. Di Battista and U. Zwick (Eds.): ESA 2003, LNCS 2832, pp. 605-617, 2003, 13 pages.

* cited by examiner

*Primary Examiner* — Sana Al Hashemi
(74) *Attorney, Agent, or Firm* — Hickman Palermo Becker Bingham LLP (57) ABSTRACT

A table is processed to determine an approximate NDV for a plurality of groups. For each row, a group based is identified based on one or more group-by columns. A hashed valued is generated by applying a uniform hash function to a value in an NDV column. The hashed value is assigned to a particular bucket based on the values at a first set of bit positions in a binary representation of the hashed value. A bit position value is determined based on for a remaining portion of the binary representation of the hashed value. The bit position value is based on a number of ordered bits in the hashed value that match a particular bit pattern. For each group identified, a maximum bit position (MBP) table is generated. The MBP table stores, for one or more buckets, the maximum bit position value determined for hashed values assigned to a particular bucket.

22 Claims, 3 Drawing Sheets

APPROXIMATE DISTINCT COUNTING IN A BOUNDED MEMORY

This application claims the benefit of U.S. Provisional Application No. 62/195,740 entitled APPROXIMATE DISTINCT COUNTING IN A BOUNDED MEMORY, filed Jul. 22, 2015, the contents of which are incorporated by reference for all purposes as if fully set forth herein.

FIELD

Embodiments described herein relate generally to data processing, and more specifically, to techniques for approximating number of distinct values.

BACKGROUND

An important function performed by a database management system is aggregating data. Typically, an aggregation function is applied to a set of values, such as the values in a specified column of a set of rows in table. One important aggregate function is the count( ) function, which returns the number of values in a specified column.

A distinct aggregate function applies the aggregate function to each unique value in the set of values. For example, even if the value "1" appears multiple times in the specified column, the aggregate function should only be applied to the value "1" once. A non-distinct counting function, represented to hereafter as "count( )", will return the number of entries in the set. A distinct counting function, represented to hereafter as "count_distinct( )", will return the number of distinct entries in the set. For example, for the set of values $\{1, 1, 1, 3\}$, count_distinct( ) returns 2, while count( ) returns 4.

The number of distinct entries in the set is referred to hereafter as the number of distinct values (NDV). NDV is heavily used in database queries and OLTP workloads. NDV is also valuable for business intelligence applications. Data such as web click logs and social network interactions can easily involve petabytes of data. NDV functions can glean important information from such data, such as number of distinct page views and distinct users.

For a non-distinct count function, a single pass is sufficient to determine the exact number of distinct entries in a set, and the function may be performed in a distributed manner without retaining specific values encountered in the set. However, to determine the NDV of a set of values, the distinct values must be tracked during the calculation in order to determine whether subsequently processed values are unique. Likewise, the distinct values must be shared across multiple processes when the operation is performed in a distributed manner. Thus, memory consumption can be intensive when the number of distinct values is large due to tracking all the distinct values that are observed.

When the memory consumption is so large that the tracked distinct values have to be spilled, or written, to disk, performance is substantially affected. For example, the tracked distinct values may be spilled to disk when the tracked data does not fit in available memory. When data is spilled to disk, the performance of the disk media becomes a bottleneck because the disk access latency limits performance during subsequent computations.

To minimize usage resource such as computation and memory, the NDV may be approximated. One way of calculating an approximate NDV is by sampling. A distinct count is performed on a sample of values in the set. The distinct sample count is then scaled up to represent the entire set. However, sampling techniques can produce inaccurate statistics.

Based on all of the foregoing, it would be desirable for improved techniques for approximating distinct values using a bounded amount of memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for determining an approximate NDV for a set of values using a bounded memory. Typically, the set of values corresponds to the values in one or more columns of a portion of a database table. As used herein, the term "portion" includes all or any part of whatever the term "portion" modifies. Thus, a portion of a table can be the entire table, a partition of the table, or another subset of the table.

An approximate NDV is determined for one or more groups specified in a group-by clause based on probabilistic counting techniques. The approximate NDV can be used to replace the NDV when an exact value is not necessary. For example: a client may use an approximate NDV function instead of an exact distinct counting function when the approximation is sufficient; a database server may use the approximate NDV function to efficiently generate an approximate value that is useful for query optimization and other optimization techniques.

To determine the approximate NDV for a set of values in a single pass, a uniform hash function is applied to each value to generate a hashed value that can be represented by a binary number. A set of b bits of the hashed value are used to assign the hashed value to a particular bucket of $2^b$ possible buckets. For example, the set of b bits may be the first b bits of the hashed value.

The remaining bits, or remainder (r), of the hashed value, are used to update values in a maximum bit position (MBP) table. An MBP table is maintained for each group for which the NDV is determined. Thus, if an approximate NDV is determined for each year from 1990-1999, then ten MBP tables are maintained. In one embodiment, the MBP table is a hash table that stores a statistic observed for each bucket. In one embodiment, for a particular bucket, the MBP table stores the maximum position of the rightmost bit in the remainder r of the hashed values assigned to the particular bucket based on the b bits of each hashed value. The position of the rightmost bit in a binary number is the trailing bit position of the first "1" value. For example, for r=" . . . 1000", the position of the rightmost bit is 4.

After all the data is processed, the MBP table corresponding to a group includes the maximum bit position of the rightmost bit 1 for each bucket corresponding to the first b bits of any hashed value h(v) for v in the set of values V associated with the group. Using probabilistic assumptions based on the properties of the uniform hash function, an approximate NDV is calculated for one or more groups using the corresponding MBP table/s.

An MBP table has a bounded size because it stores a maximum bit position for each of up to $2^b$ buckets, where each maximum bit position is limited based on the length of r. This is a significant improvement over the unbounded memory requirements for calculating the exact NDV. An MBP table can be stored in a bounded amount of memory regardless of the number of distinct values in the set. In contrast, calculating the exact NDV requires an increasing amount of memory and time as the number of distinct values increases.

In some situations, a very large or unbounded number of approximate NDVs are calculated. For example, a database statement may include a group-and-aggregate operation that generates an approximate NDV for each of a large and possibly unbounded number of groupings indicated in the database statement. Techniques are described in greater detail herein for determining a plurality of approximate NDVs under memory pressure.

Uniform Hash Function

A uniform hash function is applied to values in a set of values to facilitate NDV approximation. The uniform hash function maps each value to a hashed value in a domain. As used herein, the term "hashed value" refers to a value to which a hash function is applied.

A uniform hash function has the property that each value has an approximately equal probability of mapping to any domain value in the domain. Stated another way, hashed values generated by the uniform hash function are expected to have a uniform distribution across the domain. The assumption of a uniform distribution allows for statistical analysis to be performed without exact knowledge of the distribution of the original values for which the approximate NDV is determined.

In one embodiment, the uniform hash function maps each input value v to a hashed value that is representable by a binary number of a fixed length. When a uniform hash function generates an output representable by a binary number of a fixed length, it can be assumed that the probability of any particular bit in a hashed value h(v) has a probability of ½ of being equal to "1" and a probability of ½ of being equal to "0". This is based on the assumption of a uniform distribution over the domain of the hash function h(v).

Bit Position Value p(x) represents a bit position value of a binary number x. As used herein, the term "bit position value" refers to a value that is based on the number of ordered bits in x that match a particular bit pattern. Two possible definitions of p(x) are provided below.

In one embodiment, the bit position value p(x) refers to the position of the rightmost bit equal to 1 in s. That is, the particular bit pattern is a "1" followed by zeroes (i.e. "1000000 . . . "). The bit position value p(x) is defined as the number of trailing zeroes plus 1. For example, p(0100)=3 for this particular definition of p(x). That is, the position of the rightmost bit equal to "1" is the third trailing bit.

In one embodiment, the bit position value p(x) refers to the position of the leftmost bit equal to 1 in x. That is, the particular bit pattern is consecutive bit values of 0 followed by 1 (i.e. " . . . 0000001"). The bit position value p(x) is defined as the number of leading zeroes plus 1. For example, p(0100)=2 for this particular definition of p(x). That is, the position of the leftmost bit equal to "1" is the second leading bit.

Although one or more subsequent examples may use a particular definition of p(x), other definitions of p(x) may be used. For clarity, one or more embodiments described herein refer to the position of the rightmost bit as equivalent to p(x); however, any bit position value based on the number of ordered bits that match a particular pattern can be used in place of the position of the rightmost bit.

Probability Model

The approximate NDV of a set of values is determined using a probability model that is based on assumptions that are derived from the uniform distribution associated with the uniform hash function. One assumption is that the value of bits within a binary representation of a hashed value is independent of the other bits. Another assumption is that the probability of a particular bit value being 1 is ½ and the probability of a particular bit value being 0 is ½.

The NDV of a set of uniformly-distributed random values R can be approximated based on the maximum p(x) for x $\in$ R. For example, when p(x) corresponds to the position of the rightmost bit equal to 1 of x, the approximate NDV of R can be approximated by the maximum position of the leftmost bit for all x as follows: $2^{max(p(x))-1}$.

By applying a uniform hash function to a set of values V whose distribution is unknown, the assumption can be made that the hashed values h(v) for v $\in$ V are uniformly distributed. Given the same definition of example definition of the bit position value p(x) for the set R, the approximate NDV of V is $2^{max(p(h(v)))-1}$. If the bit values are independent of each other, as indicated by the assumptions above, the likelihood of having a large max p(h(v)) (e.g. a large number of consecutive trailing zeroes in one of the hash values) becomes bigger the more distinct values there are in a set.

As an example, if h(V)={3, 3, 7, 5, 5, 1, 4, 5} or {011, 011, 111, 101, 101, 001, 100, 101}, the maximum position of the rightmost bit equal to 1 in the binary representations of h(v) is 3. Using this observation, the NDV is approximated as $2^{3-1}$ or 4, while the exact NDV is 5.

This simple probability model is limited because the variance of the approximate NDV is large. For example, in the set of values {32} with the 8-digit binary representation {00100000}, the maximum position of the rightmost bit is 6, and the NDV is approximated as $2^5$ or 32, while the actual NDV is 1. A single value h(v) with a large bit position value can highly affect the result. For example, when the binary representation of the values has 16 bits, a single binary value of "10000000 00000000" would lead to an approximated NDV of $2^{15}$=32768.

To minimize the variance of the approximated NDV, the set of hashed values h(v) are assigned to a plurality of subsets, or buckets. The maximum bit position value p(v) is determined for the hashed values h(v) that are assigned to each bucket. Thus, for each bucket, a maximum bit position value p(v) is determined. Even if the maximum bit position value gives an inaccurate estimate for a particular bucket, statistical techniques can be used to reduce this effect on a final estimate constructed based on the maximum bit position value stored for each bucket. This shall be described in greater detail hereafter.

Maximum Bit Position (MBP) Table

A data structure may be kept for each set of values for which an approximate NDV is calculated. In one embodiment, the data structure is a maximum bit position (MBP) table. The MBP table stores, for a particular bucket, the maximum bit position value, or $\max(p(x))$, where x corresponds to the hashed values that were assigned to the particular bucket. The term "MBP table" is used herein to refer to any data structure that stores the maximum bit position value $\max(p(x))$ for x corresponding to hashed values assigned to each of a plurality of buckets.

In one embodiment, the MBP includes data for each bucket, which may be initiated with an initial value such as 0. Alternatively, MBP table may include only maximum bit position values for buckets actually assigned hashed values for v that are actually processed.

In one embodiment, to determine the approximate NDV for a set of values V, the hashed values h(v) are assigned to buckets that correspond to a set of b specific bits of the hashed values h(v), v ∈ V. b is also referred to hereafter as the bucketing index size, while b(v) is a binary string composed of the values of the specific b bits of h(v). For example, when b=4, the hashed values will be assigned to the buckets based on the following possible values of b(h(v)): 0 (or the binary representation 0000), 1 (0001), 2 (0010), 3 (0011), 4 (0100), 5 (0101), 6 (0110), 7 (0111), 8 (1000), 9(1001), 10 (1010), 11 (1011), 12 (1100), 13 (1101), 14 (1110), and 15 (1111). In one embodiment, the b specific bits are the leading b bits. Alternatively, any set of specifically identified bit positions may be used to assign the hashed values to buckets. The maximal bit position value will be then derived from the remaining bits.

In one embodiment, the maximum bit position value stored in the MBP table M for each bucket is a maximum bit value position for the remaining portion r(v) of the hashed value h(v) after the b specific bits used for bucketing are excluded. For example, when b=4 and the hashed value $h(v_i)$ for a particular value $v_i$ is "00101110111010", $h(v_i)$ will be assigned to a bucket corresponding $b(v_i)$ or the first 4 bits, "0010." The remaining portion of $h(v_i)$ is "1110111010". After all the values v ∈ V are processed, for each bucket, the MBP table is populated with the maximum bit position value for the remaining portion r(v) of hashed values h(v) that are assigned to the buckets b(v). In other words, $M[b(v)]=\max(p(r(v)))$ for a particular b(v).

MBP Table Size

In an example configuration, an MBP table is configured such that b=12. A uniform hash function h(v) is selected such that the binary representation of the output of h(v) is uniformly distributed over a domain of 64 bits. For each value v ∈ V, b(v) represents the first 12 bits of h(v) and r(v) represents the remaining 52 bits. For each v, b(v) determines the bucket that is assigned. The MBP table stores the maximum bit position value p( ) of the remainder r(v) that is assigned to each bucket of $2^{12}$ buckets, or 4096 buckets. Because the length of each r(v) is 52 bits, 6 bits are necessary to store the maximum bit position value for each bucket. Thus, in an embodiment, to determine an approximate NDV for a set of values V, the minimum size of the MBP table M is bounded to 4096 entries of 6 bits each. More generally, the parameters by which an MBP table is bounded is $2^b$ entries of $(\log_2(|r(v)|))$ bits each, where the notation |s| refers to the length, or number of binary digits, of s.

If the set of values are processed in parallel, where p is the degree of parallelism, then p MBP tables are required for each approximate NDV calculated. If a separate approximate NDV is calculated for each group of values in a set of values, then g MBP tables are required to calculate the individual NDVs for each group, where g is the number of groups. Calculating multiple NDVs shall be described in greater detail hereafter.

Determining Approximate NDV Using MBP Table

The approximate NDV is determined by calculation that is based on a set of assumptions. The MBP table M includes, for the buckets identified by b(v), the maximum bit position value of the remainder r(h(v)) for hashed values that are assigned to each bucket. In one embodiment, the approximate NDV is calculated using Formula (1), where M represents the MBP table, and M[j] represents the maximum bit position value stored for a particular bucket j and m is the number of possible buckets.

$$approximateNDV(M) = \frac{m^2}{\sum_{j=1}^{m} 2^{-M[j-1]}} \left( m \int_0^\infty \left( \log_2\left(\frac{2+x}{1+x}\right) \right)^m dx \right)^{-1} \quad (1)$$

Merging MBP Tables

In one embodiment, two or more MBP tables are merged. MBP tables may be merged to combine MBP table values that are separately generated for values v belonging to the same set of values V to determine an approximate NDV for V.

In one embodiment, different processes may process different rows containing the different values v of V. For example, different processes running on different computing nodes may each compute an MBP table based on data that is local to the respective computing nodes, which may be later combined. Merging an MBP table is a deterministic process; no matter the degree of parallelism in distributing the rows, the same MBP table will be produced after the merging of all MBP tables generated based on a partial set of the rows.

Because each value M[j] of an MBP table M is based on a maximum function (i.e. $M[j]=\max(p(r(v)))$), n MBP tables $M_i$, where i=1, 2, . . . n, can be combined to generate a combined MBP table. The values of the MBP tables $M_i$ are used to generate the rows of the MBP table $M_c$ as follows: $M_c[j]=\max(M_i[j])$ for each j. This compares favorably to an exact NDV calculation, which requires all the distinct values to be present when distinct value data for a partial sets are combined.

Thus, two or more MBP tables generated based on subsets of a set of values can be merging in a simple computation step that is bounded in time and space. The merging creates an MBP table for the entire set of values, which can be used to determine an approximate NDV for the entire set of values. For example, merging can be performed on MBP tables generated in parallel by multiple processes and/or at multiple nodes.

Example Pseudocode for Approximating NDV

In TABLE I, example pseudocode is provided that outlines a technique for determining an approximate NDV with respect to a set of values V. h(v) is a hash function that hashes data to a binary domain representable as a fixed length binary string. The technique is based on an assumption that h(v) is a uniform hash function. p(s) is a function that returns the bit position value for an input s. The hashed values h(v) are assigned to buckets that correspond to b specific bits of the hashed values, v ∈ V. In the example pseudocode, when a hashed value h(v) is processed, b(v) is set equal to the b specific bits of h(v), while r(v) is set to equal the remaining bits of h(v). M is an MBP table maintained to determine the approximate NDV for the set of values. The function approximateNDV(M) returns the approximate NDV based on the MBP table M.

TABLE I example pseudocode for determining an approximate NDV $m = 2^b$
initiate registers M[1 ...m] to initial value (e.g. 0 or $-\infty$)
for each value v ∈ V:
{   x= h(v)
    b(v) = x1 x2... xb
    r(v) = xb+1 xb+2... xn
    M[b(v)] = max(M[b(v)], p(r(v)))}
return approximateNDV(M)

For example, when b=4 and the hashed value corresponding to a particular value $v_i$ is "00101110111 . . . ", b(v)="0010" and r(v)="1110111 . . . " After all the values v ∈ V are processed, the MBP table M should be populated with the maximum bit position value in r(v) for values that are assigned to each bucket.

The procedure continues until all values v are processed. When all values in the set of values V have been processed, the approximate NDV is determined based on the MBP table which contains the maximum position of the rightmost bit equal to 1 for the hashed values that are assigned to each bucket. In one embodiment, the function approximateNDV (M) returns a value computed based on Formula (1).

Procedure Overview of Approximating NDV

Figure 1:
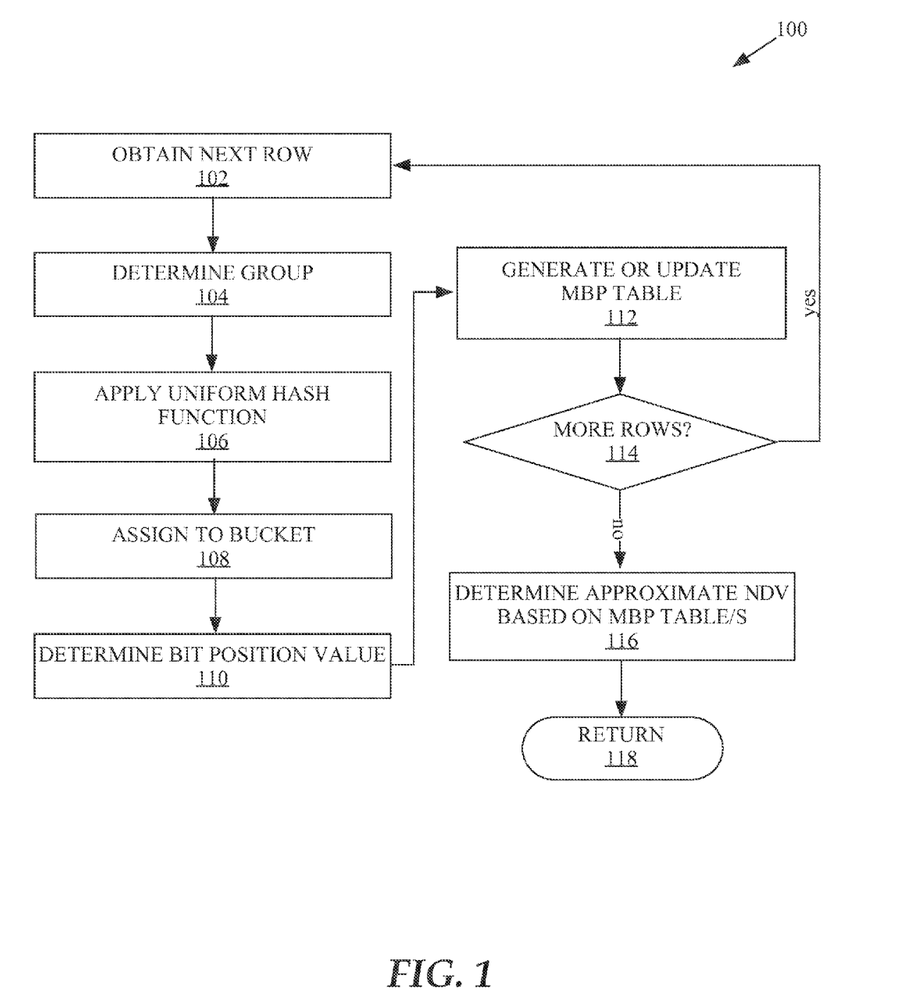
FIG. 1 is a flow diagram that depicts an embodiment of a process for approximating an NDV in a bounded amount of memory.
Figure 3:
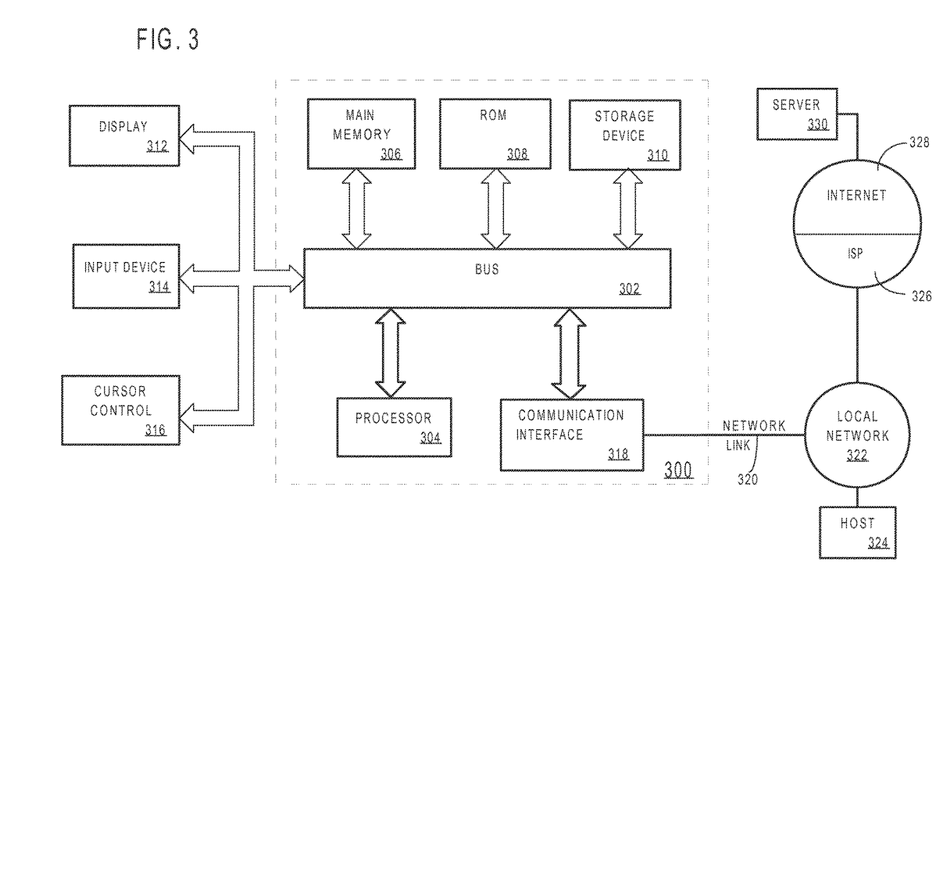
FIG. 3 illustrates a computer system upon which one or more embodiments may be implemented.

FIG. 1 is a flow diagram that depicts an embodiment of a process for approximating an NDV for one or more groups in a bounded amount of memory. Process 100 may be performed by one or more computing devices and/or processes thereof. For example, one or more blocks of process 100 may be performed by computer system 300.

At block 102, the next row is obtained. At block 104, a particular group is identified for the current row. The particular group is identified by the values in a set of one or more group-by columns of the row. The value in the NDV column of the row is used to approximate the NDV for the particular group. The NDV column is the column for which the approximate NDV is being determined.

At block 106, a uniform hash function is applied to the value to generate a hashed value. At block 108, the hashed value is assigned to a particular bucket based on the values at a first set of bit positions in a binary representation of the hashed value. In one embodiment, the first set of bit positions are the b leading bits of the binary representation of the hashed value.

At block 110, a bit position value is determined for the hashed value based on for a remaining portion of the binary representation of the hashed value. The first set of bit positions used to determine the particular bucket are excluded from the remaining portion. The bit position value is based on a number of ordered bits in the hashed value that match a particular bit pattern. In one embodiment, the bit position value for the hashed value is based on the position of the rightmost bit equal to 1 in the remaining portion of the binary representation of the hashed value.

At block 112, the bit position value is used to generate or update a corresponding MBP table. In one embodiment, when an MBP table is not yet maintained for the particular group, an MBP table is generated, and the bit position value is stored in association with the particular bucket; when an MBP table is already maintained for the particular group the MBP table is updated to store, in association with the particular bucket, the greater of an existing bit position value stored in association with the particular bucket and the bit position value determined for the remaining portion of the binary representation of the hashed value.

At block 114, it is determined if more rows remain to be processed. If more rows remain to be processed, processing continues to block 102. Otherwise, processing continues to block 116. At block 116, one or more approximate NDVs are determined for in the NDV column of the portion of the table based on one or more MBP tables generated.

At block 118, process 100 returns. For example, processing may pass control to a calling process, generate any appropriate record or notification, return after a method or function invocation, or terminate.

Group-and-Aggregate Operation

A group-and-aggregate operation performs both a grouping operation and an aggregate operation on a portion of a table. The aggregation operation is applied separately each grouping. Each grouping identifies a subset of rows of the table that has a distinct set of values for one or more columns specified in the group-by clause of the database statement. Such columns are referred to hereafter as "group-by columns." The one or more columns on which the aggregation operation is performed are referred to hereafter as the "aggregation column/s." For simplicity, the column on which an approximate NDV operation is performed is referred to hereafter as the "NDV column."

Example database statement 1 includes a group and aggregate operation. Example database statement 1 groups the rows of the sales table by the product_id and returns the NDV in the customer_id for each distinct product_id. In other words, example database statement 1 will generate a table of rows, each row identifying a product and the number of different customers that ordered the product. The group-by column is product_id and the NDV column is customer_id.

Example Database Statement 1:

SELECT product_id, count_distinct(customer_id) AS
"Number of Customers"
   FROM sales
   GROUP BY product_id;

TABLE II illustrates example results of example database statement 1.

TABLE II

| Product_id | Number of Customers |
| --- | --- |
| 13 | 2516 |
| 14 | 2030 |
| 15 | 2105 |
| ... | |

Multiple group-by columns may be identified in the group-by clause of a database statement. In this case, every distinct combination of group-by column values will be treated as a group.

Example database statement 2 will generate a table, each row of the table identifying a particular product, a particular state, and the number of different customers that ordered the particular product in the particular state. The group-by columns are product_id and state, and the NDV column is customer_id.

Example Database Statement 2:

```
SELECT product_id, state, count_distinct(customer_id)
    FROM sales
    GROUP BY product_id, state;
```

When the domain of a group-by column is known, then the number of groupings is bounded by the number of unique values in the domain. For example, if there are 10,000 possible product_id values, then the number of groupings generated by example database statement 1 is limited to 10,000. If the number of possible states is 51, then the number of groupings generated by example database statement 2 is limited to 510,000. The number of groupings can quickly grow due to additional group-by columns and/or group-by columns with a large domain or an unbounded domain.

In example database statement 3, an approximate_count_distinct( ) function replaces the count_distinct( ) function of example database statement 2.

Example Database Statement 3:

```
SELECT product_id, state, approximate_count_distinct(customer_id)
    FROM sales
    GROUP BY product_id, state;
```

The approximate_count_distinct function determines the approximate NDV using a bounded amount of memory for each grouping specified by the group-by columns. If there are 10,000 possible product_id values and 51 possible states, then the memory requirement can reach 510,000 times the size of the MBP table. Even if each MBP table is 4 KB, the memory requirements can reach 2 GB.

In order to handle group-by columns with unbounded domains and/or with values that are not limited to specified values, adaptive techniques may be used to prevent spilling data to disk and adversely affecting performance. Such adaptive techniques are described in greater detail hereafter.

Group-by Pushdown

In parallel execution, the computation involved in a group-and-aggregate operation can be "pushed down" to that is likely to perform the operations at a lower cost, these computations may reduce the amount of data that needs to be transmitted upstream. This is referred to as group-by pushdown. Group-by pushdown can be used to move computation to a more efficient process and/or node. For example, a process that is executing a database statement can push down the group-and-aggregate operation to a process that scans the rows of the table.

Example database statement 4 is a group-and-aggregate function that returns the number of distinct customers grouped by state.

Example Database Statement 4:

```
SELECT state, count_distinct(customer_id)
    FROM sales
    GROUP BY state;
```

Typically, when example database statement 4 is executed, one or more scanning processes retrieve the rows of the sales table and send them to one or more consumer processes. As used herein, the term "scanning process" refers to an instance of a sequence of computer-executable instructions being executed, where the instance reads one or more rows of a stored table. Scanning is typically performed by a process that is local to the medium on which the scanned portion of the table is stored. As used herein, the term "consumer process" refers to an instance of a sequence of computer-executable instructions being executed, where the instance receives data from a scanning process. The scanning processes may hash or otherwise distribute the scanned rows so that rows belonging to a particular group are sent to a particular consumer process. However, it is not guaranteed that this technique will equally distribute the rows.

When a group-by pushdown technique is used with example database statement 4, the scanning processes each compute the distinct count for each state as the rows are scanned. For example, if two processes scan the sales table to produce an exact NDV, each process would track the distinct customer_id values for each state it encounters. Then, each process sends the consumer process/es the tracked distinct customer_id values.

Group-by Pushdown with Approximate NDV

Example database statement 5 is a group-and-aggregate function that returns the NDV for customers grouped by state.

Example Database Statement 5:

```
SELECT state, count_distinct(customer_id)
    FROM sales
    GROUP BY state;
```

When a group-by pushdown technique is used to execute a group-and-aggregate operation that includes an approximate NDV function, each scanning process generates an MBP table for each grouping it encounters with respect to the group-by columns. For example, a scanning process that reads 1000 rows for CA, 2000 rows for NY, 1500 rows for NJ and 400 rows for WA generates 4 MBP tables. Each MBP table for a corresponding grouping (e.g. CA, NY, NJ and WA) is generated based only on customer_id values obtained from rows that identify the corresponding group.

When multiple scanning processes process the rows of the table (e.g. sales) in parallel, each scanning process has an MBP table for each grouping that it has discovered by scanning. For example, with respect to example database statement 5, a first scanning process that scans a first portion of the table may generate MBP tables for each of the groupings {CA, NY, NJ and WA}, while a second scanning process that scans a second portion of the table may generate MBP tables for each of the groupings {CA, NY, NJ, AZ, OR}.

To obtain the final MBP table for each grouping, the MBP tables for each particular group are merged. For example, the final MBP table for the grouping CA is generated by merging the MBP table generated by the first scanning process for CA with the MBP table generated by the second scanning process for CA. MBP tables may not be generated for each grouping at each scanning process, such as when a scanning process does not encounter a particular grouping. For example, the second scanning process did not scan any rows belonging to the grouping WA, while the first scanning process did not scan any rows belonging to the groupings AZ and OR. Thus, in the given example, the final set of MBP tables includes one MBP table for each of the groupings {CA, NY, NJ, WA, AZ and OR}.

Adaptive Passthrough Under Memory Pressure with Approximate NDV

Although the MBP table can be generated using a bounded amount of memory, some group-and-aggregate operations may require the calculation of an approximate NDV for each of many groupings. As noted above with respect to example database statement 3, if a first group-by column has 10,000 possible values and a second group-by column has 51 possible values, the memory requirement can reach 2 GB. To avoid reduced performance from spilling data to disk, one embodiment implements an adaptive passthrough technique that is used when memory pressure is detected while performing a group-by pushdown technique.

In one embodiment, when memory pressure is detected, a scanning process that generates MBP tables for each approximate NDV no longer stores and updates the MBP tables. Instead, the current MBP tables are sent to the one or more consumer processes. Each subsequent row that is processed is passed to the consumer process. In one embodiment, the processed row is passed to the consumer process as an MBP table that is generated based on a single value from the processed row. A MBP table that is generated based only a single value is referred to hereafter as a "passthrough MBP table." Because an MBP table for a subset of data is easily merged with other MBP tables for other subsets of data, a passthrough MBP table that only contains data for one row can be easily merged with other data by the consumer process.

For example, when an approximate NDV is determined for a particular column and memory pressure is detected by a scanning process, the scanning process passes any current MBP table to the consumer process and no longer maintains any MBP table in memory. For each subsequent row that is processed, a passthrough MBP table is generated and passed through to the consumer process. TABLE III represents an example passthrough MBP table that is generated for a particular row that includes a value v in a column for which the approximate NDV is being determined.

TABLE III example passthrough MBP table

| Bucket | value |
|--------|-------|
| 000 | 0 |
| 001 | p(r(v)) |
| 010 | 0 |
| 011 | 0 |
| 100 | 0 |
| 101 | 0 |
| 110 | 0 |
| 111 | 0 |

In the example passthrough MBP table, b is 3, and b(v) is 001, and r(v) is the remainder of h(v) after b(v) is excluded. Because the passthrough MBP table only contains the data for one row, p(r(v)) is automatically the maximum p(r(v)) with respect to hashed values h(v) assigned to the bucket b(v).

Memory pressure may be detected at execution time of a database statement. In one embodiment, a scanning process may use the adaptive passthrough technique when memory pressure is detected. The scanning process may return to a normal mode of operation when memory pressure is no longer detected. In other words, the scanning process returns to maintaining a single MBP table for each approximate NDV being calculated.

MBP Table Compression with Adaptive Passthrough

When adaptive passthrough is used on with group-by pushdown for an approximate NDV operation, the scanning process generates the passthrough MBP table and directly passes it to the consumer process without storing it in local memory. Transmitting the passthrough MBP tables has the benefit of mergeablility, and computing the passthrough MBP tables at each scanning process may better take advantage of parallelism. However, although the passthrough MBP table has a bounded size, transmitting a single passthrough MBP table for each row can involve significantly more communication over transmitting each value v.

For example, consider an example MBP table generated with a uniform hash function h(v) with a 64 bit domain and a bucketing index size b=12. The bit size of the example MBP table is ($2^{12}$ buckets)*ceil(log(64−12)). A passthrough MBP table containing a single entry based on the remainder r(v) of h(v) can be substantially larger than the original value v.

In one embodiment, each passthrough MBP table is compressed before transmitting. As used herein, the term "compressed passthrough MBP structure" refers to a compressed passthrough MBP table that is compressed using any compression method. Thus, when memory pressure is detected, a compressed passthrough MBP structure is passed through for each value in the set of values for which the approximate NDV is determined.

When each bucket of the MBP table is initiated to 0, then a passthrough MBP table for a single value would only contain one non-zero entry, as illustrated in TABLE III. Thus, such a passthrough MBP table is highly compressible.

In one embodiment, the binary representation of a compressed passthrough MBT structure includes b bits representing the bucket containing the single entry and $(\log(|r|))$ bits representing the maximum bit position of the first leading bit of the remainder r(v) of the hashed value. Thus, the required bit size of the compressed passthrough MBP structure is $b+(\log(|r|))$. In the example MBP table given, an MBP table requires up to 4096*6 bits, while the compressed passthrough MBP structure requires only 12+6=18 bits.

Procedure Overview Under Memory Pressure

Figure 2:
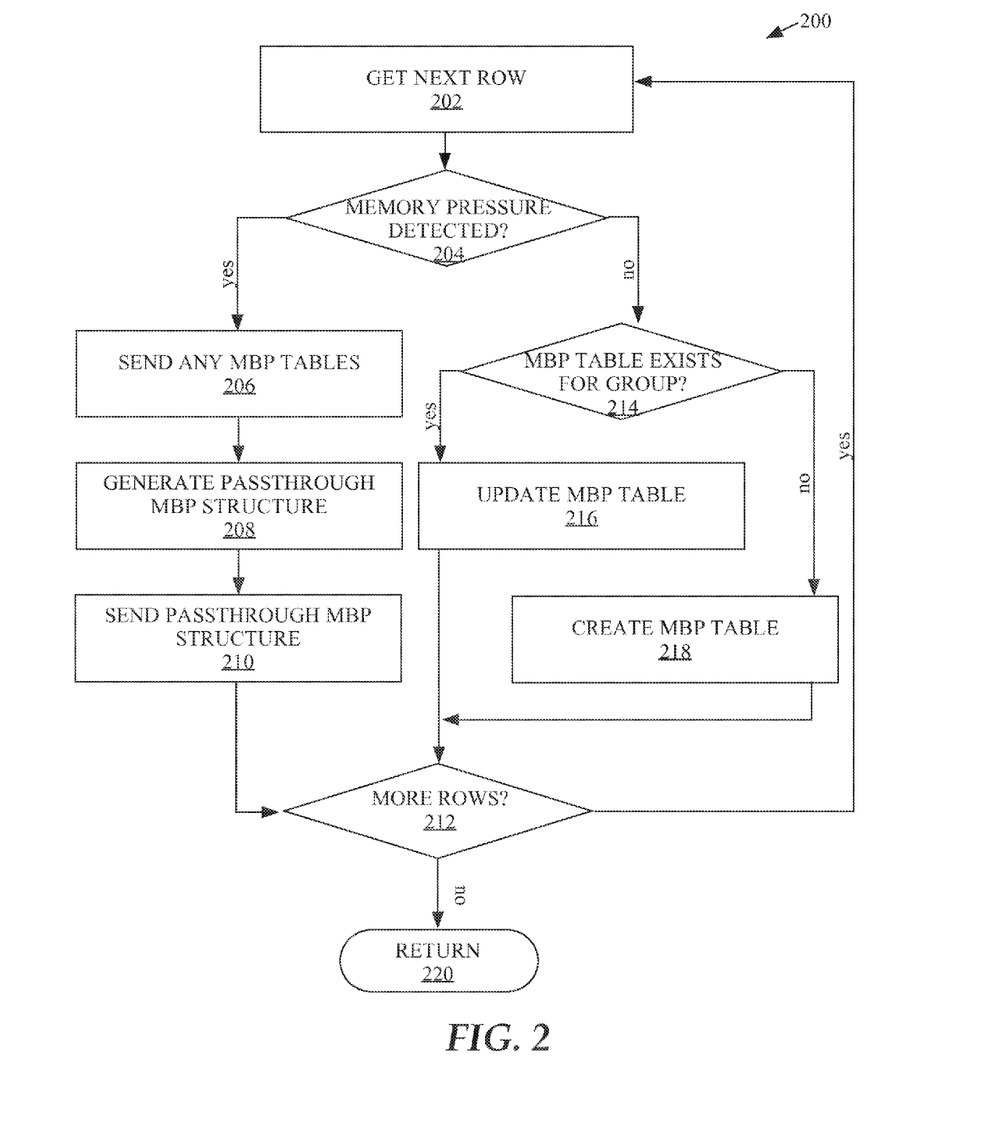
FIG. 2 is a flow diagram that depicts an embodiment of a process for processing rows by a scanning process to determine an approximate NDV under memory pressure.

FIG. 2 is a flow diagram that depicts an embodiment of a process for processing rows by a scanning process to determine an approximate NDV under memory pressure. Process 200 may be performed by one or more computing devices and/or processes thereof. For example, one or more blocks of process 200 may be performed by computer system 300. In one embodiment, one or more blocks of process 200 are performed by a scanning process.

At block 202, the next row is obtained from a table during a group-by pushdown operation that determines an approximate NDV for a plurality of groups in a set of values. The plurality of groups are specified by a group-by clause in a database statement, and the approximate NDV is determined for values in an NDV column of a portion of a table.

At decision block 204, it is determined whether memory pressure is detected. Memory pressure may be determined based on the amount of memory available in a system, such as a system on which the scanning process is executing. If memory pressure is detected, processing continues to block 206. Otherwise, processing continues to block 214.

At block 206, any MBP tables previously generated for any rows previously processed are transmitted to a consumer process. Each MBP table corresponds to a particular grouping. The scanning process no longer maintains these previously generated MBP tables after passing them to the consumer process.

At block 208, MBP data is generated for the single row. For example, the MBP data for the single row may be a passthrough MBP table or a compressed passthrough MBP structure. The MBP data specifies a particular bucket based on a specified set of b bits b(v) in a hashed value h(v) generated on the column value for the NDV column. The MBP data also specifies a bit position value of a remainder r(v) of the hashed value after the b bits are excluded. In one embodiment, the bit position value is the position of the rightmost bit equal to 1 in r(v).

At block 210, the passthrough MBP table is passed on, such as by transmitting the MBP table to a consumer process.

In one embodiment, blocks 206-210 describe operation under memory pressure, while blocks 214-216 describe operation in a normal mode. At decision block 214, it is determined whether a MBP table has been created for a particular grouping indicated by the values of the group-by column is in the current row. If, the MBP table exists, processing continues to block 216, where existing MBP table is updated based on the value in the NDV column of the current row. Returning to decision block 214, if the MBP table does not exist, then the MBP table is created and populated based on the value in the NDV column of the current row.

At decision block 212, it is determined whether more rows remain to be processed. If more rows remain to be processed, processing continues to block 202. Otherwise, processing continues to block 220, where process 200 returns. For example, processing may pass control to a calling process, generate any appropriate record or notification, return after a method or function invocation, or terminate.

Materialized View Support

A materialized view is a database object that contains stored results. A materialized view may include aggregated information. In one embodiment, one or more MBP tables are stored for one or more groups after an approximate NDV is determined. For example, if a group-and-aggregate operation is performed that approximates a number of unique customers for each city, the MBP table generated for each city, may be stored. The approximate number of unique customers for a particular city can be quickly determined based on the MBP table for the particular city.

The approximate NDV of any set of groups can also be quickly calculated by performing the merging operation on one or more stored MBP tables. In the previous example that stores an MBP table for each city, the approximate number of unique customers can be determined for combinations of groups, such as "cities in California," "coastal cities," or "cities with a population of greater than 100,000." Such determinations can be made by simply identifying the cities that belong to the new group, retrieving the stored MBP table for the identified cities, and merging the retrieved MBP tables.

In one embodiment, functions are provided to support the use of an approximate NDV function and MBP tables in a materialized view framework. For example, functions may be provided to: serialize an MBP table (e.g. "approx_count_distinct_detail( )"), aggregate two or more MBP tables (e.g. "approx_count_distinct_agg( )"), and to generate the approximate NDV based on an input MBP table (e.g. "approx_count_distinct_agg( )").

In one embodiment, a database statement is rewritten to take advantage of existing materialized view data. Rewriting a database statement involves modifying the database statement and/or a query execution plan generated for the database statement. The rewritten database statement is semantically equivalent to the original database statement. For example, consider the materialized view created in example database statement 6:

Example Database Statement 6:

```
CREATE materialized view MV1 AS
    SELECT month, week,
        approx_count_distinct_detail(customer_id) detail
    FROM sales
    GROUP BY month, week;
```

Example database statement 7 may be rewritten as example database statement 8 to take advantage of the stored MBP tables of the materialized view MV1.

Example Database Statement 7:

```
SELECT month, approx_count_distinct(customer_id) detail
    FROM sales
    GROUP by month;
```

Example Database Statement 8:

```
SELECT month,
    to_approx_count_distinct(approx_count_distinct_agg(detail))
    FROM MV1
    GROUP by month;
```

A materialized view that includes MBP table data can be quickly updated to reflect inserted rows by applying approx_count_distinct_agg to merge the MBP table on the delta changes and the existing MBP tables stored in the MV.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Example Implementation System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that depicts a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  processing rows in a portion of a table to determine an approximate number of distinct values (NDV) in an NDV column for a plurality of groups specified in a set of one or more group-by columns;
  wherein each group of said plurality of groups is associated with a respective maximum bit position (MBP) table of a plurality of MBP tables, said respective MBP table including a respective plurality of buckets;
  wherein processing said rows in said portion of said table includes, for each row of said rows;
  identifying a respective group of said plurality of groups for said each row based on one or more row values in the set of one or more group-by columns;
  generating a hashed value by applying a uniform hash function to a row value in the NDV column of said each row;
  assigning the hashed value to a particular bucket of the respective MBP table of said respective group based on values at a first set of bit positions in a binary representation of the hashed value;
  determining a bit position value based on a remaining portion of the binary representation of the hashed value, wherein the first set of bit positions are excluded from the remaining portion; and
  wherein the bit position value is based on a number of ordered bits in the hashed value that match a particular bit pattern;
  for each group of said plurality of groups, generating a particular maximum bit position for each particular bucket of one or more buckets of the respective MBP table associated with said each group, comprising, for said each particular of said one or more buckets, a maximum bit position value determined for one or more hashed values assigned to said each particular bucket;
  determining one or more approximate NDVs for one or more particular groups of the plurality of groups based on one or more MBP tables of said plurality of MBP tables; and
  wherein the method is performed by one or more computing devices.

2. The method of claim 1, wherein, for said each row of said rows in said portion of said table, determining the bit position value is based on a position of a rightmost bit equal to 1 in the remaining portion of the binary representation of the hashed value.

3. The method of claim 1,
  wherein processing each row of the portion of the table is performed by a plurality of scanning processes that each process a subset of rows from the portion of the table; and
  wherein each scanning process of the plurality of scanning processes generates an MBP table for each group identified by said each scanning process.

4. The method of claim 3, further comprising merging MBP tables generated by different scanning processes for one or more identical groups thereby generating one or more merged MBP tables,
  wherein determining one or more approximate NDVs for each of the one or more identical groups is based on said one or more merged MBP tables.

5. The method of claim 1, wherein processing said rows in said portion of said table includes, for each row of said rows in said portion of said table;
  when an MBP table has not been generated for the respective group identified for said each row, generating an MBP table for the respective group and storing, in the MBP table for the respective group, the bit position value determined for the remaining portion of the binary representation of the hashed value, wherein the bit position value is stored in association with the particular bucket the hashed value is assigned to; and
  when an MBP table has been generated for the respective group identified for said each row, updating the MBP table of the respective group to store, in association with the particular bucket the hashed value is assigned to, a greater of an existing bit position value stored in association with the particular bucket the hashed value is assigned to and the bit position value determined for the remaining portion of the binary representation of the hashed value.

6. The method of claim 1,
wherein processing said rows in said portion of said table is performed by one or more first processes;
wherein the one or more first processes generate an MBP table for each group identified by the one or more first processes while processing the rows;
further comprising sending to one or more second processes, by the one or more first processes, the MBP table for said each group identified by the one or more first processes;
wherein determining the one or more approximate NDVs for the one or more particular groups is performed by the one or more second processes.

7. The method of claim 6, further comprising:
detecting memory pressure by a particular first process of the one or more first processes;
in response to detecting memory pressure:
sending, by the particular first process, any MBP tables generated by the particular first process to the one or more second processes;
generating a passthrough MBP structure of one or more passthrough MBP structures for each particular row subsequently processed by the particular first process and sending the passthrough MBP structure to the one or more second processes;
wherein each passthrough MBP structure of said one or more passthrough MBP structures includes data identifying a particular bucket for said each particular row subsequently processed and the bit position value for a remainder of the hashed value for said each particular row subsequently processed.

8. The method of claim 7, wherein each passthrough MBP structure of said one or more passthrough MBP structures is compressed.

9. The method of claim 1, further comprising storing, as part of a materialized view, the plurality of MBP tables.

10. The method of claim 9, further comprising rewriting a database statement comprising an approximate NDV function to compute an approximate NDV based on the plurality of MBP tables stored as part of a materialized view.

11. The method of claim 9, further comprising incrementally updating the plurality of MBP tables stored as part of the materialized view when a new row is inserted in the table by:
identifying a particular group based on one or more values in the new row in a set of one or more group-by columns, wherein a particular MBP table of said plurality of said MBP tables stored for the materialized view is associated with said particular group;
generating a particular hashed value by applying the uniform hash function to a value in the NDV column of the new row;
determining a particular bucket based on the values at the first set of bit positions in a binary representation of the particular hashed value;
determining a particular bit position value for the particular hashed value based on a remaining portion of the binary representation of the particular hashed value;
if a current value in the particular MBP table is less than the particular bit position value, updating the particular MBP table for the particular group with the particular bit position value.

12. One or more non-transitory storage media storing one or more sequences of instructions, which when executed by one or more computing devices, cause:
processing rows in a portion of a table to determine an approximate number of distinct values (NDV) in an NDV column for a plurality of groups specified in a set of one or more group-by columns;
wherein each group of said plurality of groups is associated with a respective maximum bit position (MBP) table of a plurality of MBP tables, said respective MBP table including a respective plurality of buckets;
wherein processing said rows in said portion of said table includes, for each row of said rows;
identifying a respective group of said plurality of groups for said each row based on one or more row values in the set of one or more group-by columns;
generating a hashed value by applying a uniform hash function to a row value in the NDV column of said each row;
assigning the hashed value to a particular bucket of the respective MBP table of said respective group based on values at a first set of bit positions in a binary representation of the hashed value;
determining a bit position value based on a remaining portion of the binary representation of the hashed value, wherein the first set of bit positions are excluded from the remaining portion; and
wherein the bit position value is based on a number of ordered bits in the hashed value that match a particular bit pattern;
for each group of said plurality of groups, generating a particular maximum bit position for each particular bucket of one or more buckets of the respective MBP table associated with said each group, comprising, for said each particular bucket of said one or more buckets, a maximum bit position value determined for one or more hashed values assigned to said each particular bucket; and
determining one or more approximate NDVs for one or more particular groups of the plurality of groups based on one or more MBP tables of said plurality of MBP tables.

13. The one or more non-transitory storage media of claim 12, wherein, for said each row of said rows in said portion of said table, determining the bit position value is based on a position of a rightmost bit equal to 1 in the remaining portion of the binary representation of the hashed value.

14. The one or more non-transitory storage media of claim 12, wherein the one or more sequences of instructions include instructions that, when executed by one or more computing devices, cause:
processing each row of the portion of the table to be performed by a plurality of scanning processes that each process a subset of rows from the portion of the table; and
wherein each scanning process of the plurality of scanning processes generating an MBP table for each group identified by said each scanning process.

15. The one or more non-transitory storage media of claim 14, wherein the one or more sequences of instructions include instructions that, when executed by the one or more computing devices, cause:
merging MBP tables generated by different scanning processes for one or more identical groups thereby generating one or more merged MBP tables; and wherein determining one or more approximate NDVs for each of the one or more identical groups is based on said one or more merged MBP tables.

16. The one or more non-transitory storage media of claim 12, wherein the one or more sequences of instructions include instructions that, when executed by the one or more computing devices, cause while processing each particular row;
when an MBP table has not been generated for the respective group identified for said each row, generating an MBP table for the respective group and storing, in the MBP table for the respective group, the bit position value determined for the remaining portion of the binary representation of the hashed value, wherein the bit position value is stored in association with the particular bucket the hashed value is assigned to; and
when an MBP table has been generated for the respective group identified for said each row, updating the MBP table of the respective group to store, in association with the particular bucket the hashed value is assigned to, a greater of an existing bit position value stored in association with the particular bucket the hashed value is assigned to and the bit position value determined for the remaining portion of the binary representation of the hashed value.

17. The one or more non-transitory storage media of claim 12, wherein the one or more sequences of instructions include instructions that, when executed by the one or more computing devices, causes:
processing said rows in said portion of said table to be performed by one or more first processes;
the one or more first processes generating an MBP table for each group identified by the one or more first processes while processing the rows;
sending to one or more second processes, by the one or more first processes, the MBP table for said each group identified by the one or more first processes; and
determining the one or more approximate NDVs for the one or more particular groups to be performed by the one or more second processes.

18. The one or more non-transitory storage media of claim 17, wherein the one or more sequences of instructions include instructions that, when executed by the one or more computing devices, cause:
detecting memory pressure by a particular first process of the one or more first processes;
in response to detecting memory pressure:
sending, by the particular first process, any MBP tables generated by the particular first process to the one or more second processes;
generating a passthrough MBP structure of one or more passthrough MBP structures for each particular row subsequently processed by the particular first process and sending the passthrough MBP structure to the one or more second processes;
wherein each passthrough MBP structure of said one or more passthrough MBP structures includes data identifying a particular bucket for said each particular row subsequently processed and the bit position value for a remainder of the hashed value for said each particular row subsequently processed.

19. The one or more non-transitory storage media of claim 18, wherein each passthrough MBP structure of said one or more passthrough MBP structures is compressed.

20. The one or more non-transitory storage media of claim 19, wherein the one or more sequences of instructions include instructions that, when executed by the one or more computing devices, cause storing, as part of a materialized view, the plurality of MBP tables.

21. The one or more non-transitory storage media of claim 20, wherein the one or more sequences of instructions include instructions which, when executed by the one or more computing devices, cause:
rewriting a database statement comprising an approximate NDV function to compute the approximate NDV based on the plurality of MBP tables stored as part of a materialized view.

22. The one or more non-transitory storage media of claim 20, wherein the one or more sequences of instructions include instructions that, when executed by the one or more computing devices, cause incrementally updating the plurality of MBP tables stored as part of the materialized view when a new row is inserted in the table by:
identifying a particular group based on one or more values in the new row in a set of one or more group-by columns, wherein a particular MBP table of said plurality of said MBP tables stored for the materialized view is associated with said particular group;
generating a particular hashed value by applying the uniform hash function to a value in the NDV column of the new row;
determining a particular bucket based on the values at the first set of bit positions in a binary representation of the particular hashed value;
determining a particular bit position value for the particular hashed value based on a remaining portion of the binary representation of the particular hashed value;
if a current value in the particular MBP table is less than the particular bit position value, updating the particular MBP table for the particular group with the particular bit position value.

* * * * *